United States Patent [19]

Arroyo et al.

[11] Patent Number: 5,133,034

[45] Date of Patent: Jul. 21, 1992

[54] COMMUNICATIONS CABLE HAVING A STRENGTH MEMBER SYSTEM DISPOSED BETWEEN TWO LAYERS OF WATERBLOCKING MATERIAL

[75] Inventors: Candido J. Arroyo, Lithonia; Jill B. Fluevog, Norcross; Krishnaswamy Kathiresan, Marietta, all of Ga.

[73] Assignee: AT&T Bell Laboratories, Murray Hill, N.J.

[21] Appl. No.: 747,777

[22] Filed: Aug. 20, 1991

[51] Int. Cl.$^5$ .............. G02B 6/44; H02G 15/20; H02G 15/00

[52] U.S. Cl. .................. 385/107; 385/102; 385/103; 174/70 R; 174/23 R; 174/23 C; 523/173

[58] Field of Search ............ 350/96.23, 96.34; 174/23 R, 23 C, 70 R, 106 D, 109, 110 SR; 523/173; 385/102, 103, 104, 107, 111, 113, 101

[56] References Cited

U.S. PATENT DOCUMENTS

| | | | |
|---|---|---|---|
| 4,703,998 | 11/1987 | Uchioke et al. | 350/96.23 |
| 4,752,113 | 6/1988 | Saito et al. | 350/96.23 |
| 4,826,278 | 5/1989 | Gartside, III et al. | 350/96.23 |
| 4,844,575 | 7/1989 | Kinard et al. | 385/113 |
| 4,867,526 | 9/1989 | Arroyo | 385/107 |
| 4,892,382 | 1/1990 | Story et al. | 385/102 |
| 4,907,855 | 3/1990 | Oestreich | 385/107 |
| 4,913,517 | 4/1990 | Arroyo et al. | 385/107 |
| 4,974,926 | 12/1990 | Blee et al. | 385/107 |
| 5,000,539 | 3/1991 | Gareis | 350/96.23 |
| 5,020,875 | 6/1991 | Arroyo et al. | 385/102 |
| 5,029,974 | 7/1991 | Nilsson | 385/113 |

*Primary Examiner*—Brian Healy
*Attorney, Agent, or Firm*—Edward W. Somers

[57] ABSTRACT

An optical fiber cable (20) which is particularly suited for shipboard use includes a core (22) and a sheath system (30). The core includes a plurality of optical fiber cable components (24,24) each including a buffered fiber (26) and high strength aramid yarn (27). About the four optical fiber cable components which are arranged about a central organizer (25) is a waterblocking-strength member system (32) which includes at least two spaced layers (33,33) each comprising a superabsorbent material. A strength member layer (40) is disposed between each two adjacent superabsorbent layers. An outer jacket (34) comprises a plastic material which in a preferred embodiment includes a low halogen, fire-resistant material.

13 Claims, 2 Drawing Sheets

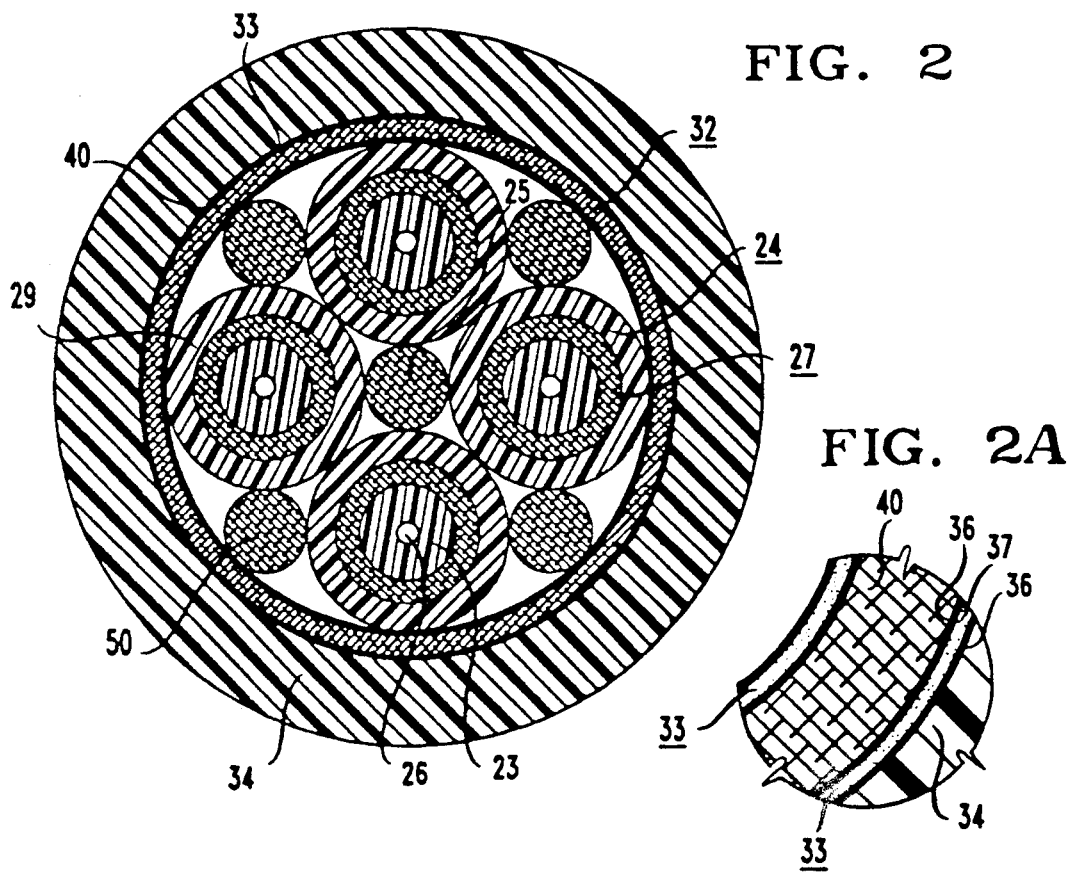
FIG. 2
FIG. 2A
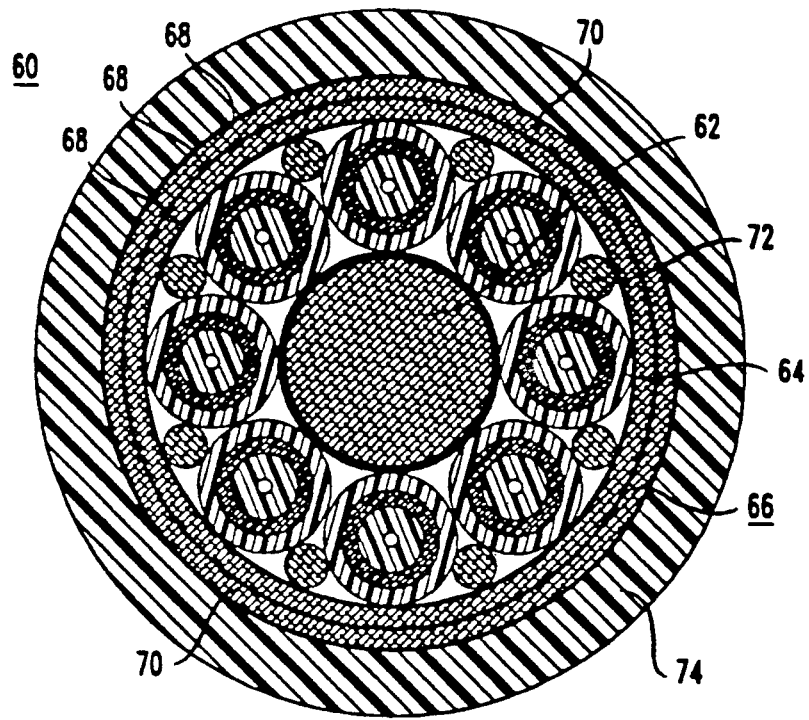
FIG. 3

COMMUNICATIONS CABLE HAVING A STRENGTH MEMBER SYSTEM DISPOSED BETWEEN TWO LAYERS OF WATERBLOCKING MATERIAL

TECHNICAL FIELD

This invention relates to a communications cable having a strength member system disposed between two layers of waterblocking material. More particularly, this invention relates to a cable which is particularly suited for shipboard use and which includes a relatively supple, fibrous strength system which is interposed between two layers of superabsorbent materials.

BACKGROUND OF THE INVENTION

In the cable industry, it is well known that changes in ambient conditions lead to differences in vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High levels of condensed moisture inside a cable sheath system may have a detrimental effect on the transmission characteristics of a metallic conductor cable, for example.

Furthermore, water may enter the cable because of damage to the cable which compromises its integrity. For example, rodent attacks or mechanical impacts may cause openings in the sheath system of the cable to occur, allowing water to enter, and, if not controlled, to move longitudinally along the cable into splice closures, for example.

Lately, optical fiber cables have made great inroads into the communications cable market. Although the presence of water itself within an optical fiber cable is not detrimental to its performance, passage of the water along the cable interior to connection points or terminals or associated equipment inside closures, for example, may cause problems especially in freezing environments and should be prevented.

Also, optical fiber cables must be provided with sufficient strength to prevent change to the optical fibers when forces are applied to the cables. Generally, this has been accomplished by including a strength member system in a core of an optical fiber cable or in the sheath system or in both.

Many optical fiber cables now include a longitudinally extending tape which has been wrapped about a core of the cables and which includes a superabsorbent material that is capable of swelling upon contact with water to block the flow of water. In U.S. Pat. No. 4,867,526 which issued on Sep. 19, 1989 in the name of C. J. Arroyo, a cable having waterblocking provisions is disclosed. Interposed between a core and a jacket is an elongated substrate member which comprises a nonmetallic, non-woven, web-like material in the form of a tape which has been impregnated with a superabsorbent material. The tape material is relatively compressible and has sufficient porosity and superabsorbent material so that it provides enhanced waterblocking capability.

In another prior art cable, a water blockable yarn is interposed between a core and an outer surface of a jacket of the cable's sheath system. The yarn extends linearly along the cable or may be wrapped helically about a portion of the sheath system. The yarn may be one which is comprised of a superabsorbent fiber material which upon contact with water swells and inhibits the movement of water within the cable.

One demanding use for optical fiber cable is aboard ship. Typically in such an environment, the optical fiber cable extends along tortuous paths. Of course, being on a ship, such a cable may be subjected to intense amounts of water until repairs are made, during which time, the cable is expected to remain operational.

In one optical fiber cable, a core comprises at least one transmission media and a plastic jacket and includes provisions for preventing the movement of water within the cable. The cable includes a yarn-like strength member system including longitudinally extending aramid ribrous strength members having a relatively high modulus and having waterblocking provisions. In one embodiment, each fibrous strength member is treated with a superabsorbent liquid material which when dry fills interstices and covers portions of the exterior thereof. In another embodiment, a filamentary strand material comprising a water swellable fibrous material is wrapped about each fibrous strength member.

Although the above-identified cable has been used aboard ships and in other environments in which cable is exposed to water, the strength member system which is treated with a superabsorbent material causes some problems. For example, it has been found to be somewhat difficult to process the treated strength members during manufacture of the cable. Also, it is relatively expensive to coat aramid fibrous yarn with a superabsorbent material. Further, the coating material on the coated yarn tends to be subject to abrasion as the coated yarn is payed off a supply spool to be wrapped about the core.

The consensus is that aramid yarn is a very suitable strength member material for optical fiber cables, but there are shortcomings associated with the impregnation of aramid yarn with a superabsorbent material. It should be apparent that both properties, strength and waterblocking, need to be provided for optical fiber cable, particularly one used on shipboard.

Also, cables for special applications may have more demanding requirements for blocking water than for cable used in commonplace applications. For example, a typical requirement for a cable is that no water flows through a one meter cable sample when a sample of the cable is subjected to a water head, i.e. pressure, of one meter over one hour. In one special application, a cable, to be acceptable, must not allow any more than thirty-three milliliters of sea water to move beyond one meter of cable when subjected to a water head of eleven meters over six hours.

What is sought after and what does not appear to be available is an optical fiber cable which is suitable for shipboard use and which is more easily manufacturable than those of the prior art. The sought after cable must meet stringent requirements for blocking water flow within and into the cable and must have suitable strength to allow the cable to be routed in tortuous paths.

SUMMARY OF THE INVENTION

The foregoing problems of the prior art have been overcome by optical fiber cable of this invention. A communications cable comprises a core having a longitudinal axis and at least one communications medium and a jacket which comprises a plastic material and which encloses the core. A waterblocking-strength member system is disposed between the core and the jacket. A waterblocking portion of the system comprises two concentric layers of waterblocking materials, each being effective to inhibit the flow of water longitudinally along the cable. A relatively supple strength member system is interposed between each two adjacent layers of the waterblocking portion of the system.

In an alternative embodiment, the water-blocking strength member system may includes more than two, e.g. three, spaced concentric layers of waterblocking material with a strength member layer disposed between each two adjacent concentric layers of the waterblocking material.

BRIEF DESCRIPTION OF THE DRAWING

Other features of the present invention will be more readily understood from the following detailed description of specific embodiments thereof when read in conjunction with the accompanying drawings, in which:

FIG. 2 and FIG. 2A show an end view of the cable of FIG 1; and

FIG. 3 is an end view of another embodiment of a cable of this invention.

DETAILED DESCRIPTION

Figure 1:
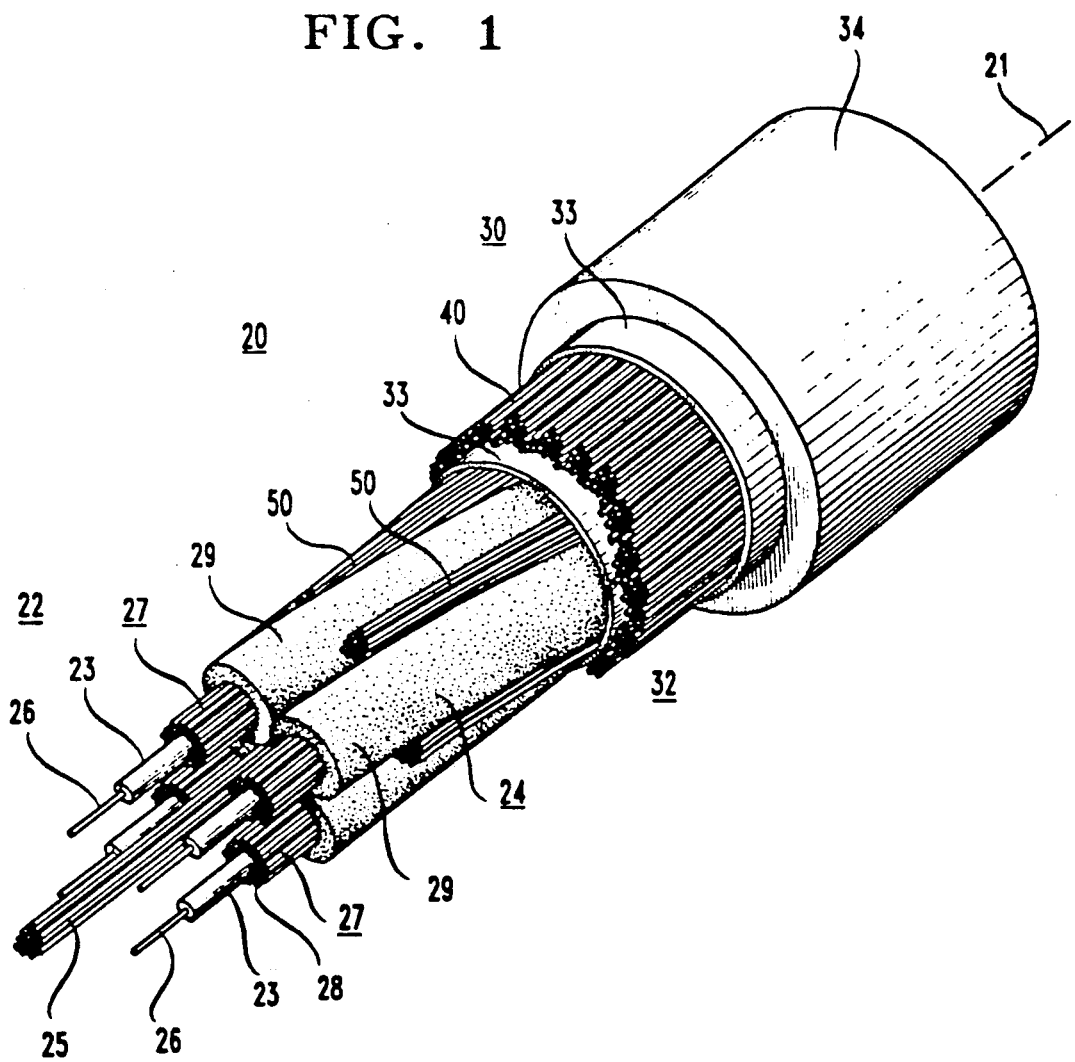
FIG. 1 is a perspective view of an optical fiber cable of this invention.

Referring now to FIGS. 1 and 2, there is shown a communications cable which is designated generally by the numeral 20. It includes a longitudinal axis 21 and a core 22 comprising one or more optical fiber cable components 24—24. The optical fiber cable components 24—24 are arrayed about a central organizer member 25 which comprises a waterblocking material in the form of yarn, for example. Fiber suitable for use in the manufacture of the organizer member 25 is manufactured by Toyobo Co., Ltd. of Osaka Japan, under the trade designation "LANSEAL-F" superabsorbent fiber. A binder may or may not be wrapped about the central organizer member 25.

Each of the optical fiber cable components 24—24 may comprise an optical fiber which is enclosed in a single or in dual layers of coating material and which has an outer diameter of about 250 μm. In the alternative, and as shown in FIGS. 1 and 2, each optical fiber cable component 24 may comprise an optical fiber 26 which includes a single or dual layers of a coating material and which is buffered, that is enclosed in a layer 23 of plastic material such as Hytrel ® plastic, for example. A strength member system 27 encloses the buffered optical fiber and a plastic jacket 29 encloses the strength member system. Typically, the strength member system 27 is comprised of a plurality of strength members 28—∞ each comprising a fibrous material.

One such fibrous strength member is an aramid fibrous yarn, such as a product which is available commercially from E. I. DuPont de Nemours under the designation KEVLAR ® yarn. KEVLAR is a DuPont registered trademark for a family of aramid fibers. Such fibrous material may be short fiber as well as continuous filament yarn. It has a relatively high tensile strength and its properties are reported in Information Bulletin K-506A dated June, 1980 and entitled "Properties and Uses of KEVLAR ® 29 and KEVLAR ® 49 In Electromechanical Cables and Fiber Optics".

The core 22 (see FIG. 1) is enclosed by a sheath system 30 which includes a waterblocking-strength member system 32 that encloses the optical fiber components, and an outer plastic jacket 34. The waterblocking strength member system 32 comprises at least two longitudinally extending waterblocking layers 33—33. Each layer 33 comprises a longitudinally extending strip of material such as one which has been treated with a water swellable superabsorbent material. Advantageously, the members 33—33 are hydrophilic. A hydrophilic material is one that has a strong affinity for water in that it absorbs water easily. The superabsorbent material provides each longitudinally extending layer 33 with a waterblocking capability. When water contacts a layer 33, the superabsorbent material reacts with the water to form a reaction product in the form of a gel. The gel is effective to block the flow of water.

In a preferred embodiment, each layer 33 is a laminate comprising two tapes 36—36 (see FIGS. 2 and 2A) having a superabsorbent powder 37 disposed therebetween. Each tape 36 may comprise polyester nonwoven material. Between the two nonwoven polyester tapes is disposed a superabsorbent material with a distribution of about 60 grams per square meter. In the laminate, the superabsorbent material comprises a superabsorbent polymer which provides a minimum swell of 15 mm in distilled water at 10 minutes.

The waterblocking tape 36 of the preferred embodiment has a mass per unit area of 118 grams per square meter and a thickness of 0.35 mm. It has a tensile strength of 25 N/cm and an elongation of 40%. The fiber composition of each of the two tapes of the laminate of the preferred embodiment is a white polyester with a polyacrylate bonding agent. The superabsorbent material is in powder form and as a superabsorbent polymer, a crosslinked postassium salt of polyacrylate/polyacrylamide copolymer.

In the alternative, each waterblocking layer 33 may comprise a substrate material which has been impregnated with a superabsorbent material. The superabsorbent material may be selected from the group consisting of (1) polyacrylic acid, (2) polyacrylamide, (3) blends of (1) and (2), (4) salts of (1) and (2), and (5) copolymers of (1) and (2). See previously mentioned U.S. Pat. No. 4,867,526.

Between the two longitudinally extending waterblockable layers 33—33 is disposed a strength member layer 40. The strength member layer 40 comprises a high strength aramid fibrous material and in the preferred embodiment comprises KEVLAR yarn. KEVLAR yarn has been described hereinbefore. The KEVLAR yarn is wrapped about the inner one of the waterblocking members 33—33 either with a stranded unidirectional lay or with a reverse oscillated lay.

Although in the preferred embodiment, one layer of strength member yarn is disposed between two waterblocking tapes, other arrangements may be used and fall within the scope of the invention. For examples, three spaced waterblocking layers may be included with a layer of strength members such as KEVLAR yarn, for example, disposed between each two adjacent layers.

In the cables of this invention, additional provisions are made for preventing the flow of water longitudinally along the cable into closures. Between the optical fiber cable components 24—24 and the waterblocking-strength member system 32 are disposed supplementary waterblocking members 50—50 each of which is comprised of a water swellable fiber material. The members 50—50 may be stranded about, or parallel to, the longitudinal axis of the cable.

In a preferred embodiment, each supplementary waterblocking member 50 is a yarn (see FIG. 1) such as a 1.67 cotton count yarn, for example, which is comprised of a water swellable fiber material. Such a yarn is disclosed, for example, in U.S. Pat. No. 4,366,206 which is incorporated by reference hereinto. The yarn of each member 50 in the preferred embodiment may be the same material used for the central organizing member 25. These members 50—50 extending longitudinally in the cable in the interstices shown add nothing to the outer diameter of the cable, but provide additional waterblocking capability.

As is seen in FIG. 1, the yarn members 50—50 as well as the optical fiber cable components 24—24 are stranded about the longitudinal axis of the cable with a unidirectional lay. In the alternative, the yarn members 50—50 and the optical fiber cable components may be wrapped about the longitudinal axis with a reverse oscillated lay.

It is important to recognize the coverage of the water blockable members 33—33 in any given plane transverse of the longitudinal axis 21 of the cable. Also, as can be seen in FIG. 2, the strength member system extends about substantially the entire inner periphery of the cable in that plane. The combination of the torsionally balanced strength member layer 40, the waterblocking layers 33—33 and the waterblocking members 50—50 provide a balanced strength system with suitable waterblocking capability.

Referring again to FIGS. 1 and 2, it can be seen that the jacket 34 is disposed about the waterblocking-strength member system 32. The jacket 34 comprises a plastic material and in a preferred embodiment is a low halogen, low smoke, low toxicity and low corrosivity fire resistant material. Also, of course, the plastic material of the jacket must be such that it meets fluid immersion properties as set forth in a military specification designated MIL-C-0085045. A suitable material for the jacket 34 is a halogen-free, flame retardant polyolefin based material filled with metal hydroxide fillers and including suitable processing aids.

Shown in FIG. 3 is an alternative embodiment of the cable of this invention. A cable designated generally by the numeral 60 includes a core comprising a centrally disposed organizing member 62. The organizing member 62 is a waterblocking member which may comprise a yarn material which is comprised of a water swellable fiber material such as that of the central member 25 in FIGS. 1 and 2.

Arranged about the centrally disposed member 62 are a plurality of optical fiber cable components 64—64. Each of the optical fiber cable components is similar in structure to each of the optical fiber components 24—24 (see FIGS. 1 and 2) and need not be described further herein.

About the optical fiber components is disposed a waterblocking-strength member system 66 comprising three spaced concentric layers 68—68 each comprising a waterblocking member. Each waterblocking member 68 may comprise spaced tapes having superabsorbent polymer in powder form therebetween. Interposed between each two adjacent waterblocking layers is a strength member system 70 preferably comprising an aramid fibrous yarn. Between each two adjacent optical fiber components 64—64 and in engagement with an innermost layer 68 is disposed a waterblocking yarn member 72 which may comprise the same material as that used for the member 50 in the embodiment of FIGS. 1 and 2. About the strength member-waterblocking system is a jacket 74 which is made of a plastic material such as that of the jacket 34 of the cable 20.

Tests have been conducted to measure water leakage from one meter test lengths of cables at a water pressure of 0.102 MPa. Each of one meter test lengths from a prior art cable included four optical fiber units enclosed in two layers of KEVLAR yarn which had been impregnated with a superabsorbent material. Table I reflects the amount of leakage for the prior art cable and for cable of this invention. An acceptable cable insofar as water leakage is concerned is one in which the leakage does not exceed 33.0 ml. As can be seen, from TABLE I, the prior art cable experienced acceptable leakage, but the cable of the invention showed improvement

TABLE I

| WATERBLOCKING TEST RESULTS FOR SHIPBOARD CABLES | | | |
|---|---|---|---|
| | | CABLE PERFORMANCE LEAKAGE | |
| CABLE | REQUIREMENT | PRIOR ART | NEW |
| FOUR FIBER CABLE | MIL-C-0085045, 0.102 MPa, 6 HRS. LEAKAGE ≦ 33 ml | 18 ml | 15 ml |
| EIGHT FIBER CABLE | MIL-C-0085045, 0.102 MPa, 6 HRS. LEAKAGE ≦ 33 ml | 27 ml | 16 ml |

Shown in TABLE II are the aging test results for a four unit optical fiber cable of this invention. The four optical fiber cable which was tested included two waterblocking layers 33—33 between which was interposed a layer of KEVLAR yarn. For the two samples of the cable of this invention up to a period of 60 days, the water leakage remained below the required outer limit of 33 ml.

TABLE II

| TIME OF EXPOSURE | TEST CONDITION | LEAKAGE |
|---|---|---|
| 0 DAYS (Baseline) | no exposure | 10 ml |
| 7 DAYS | 85° C. | 15 ml |
| 20 DAYS | 95% RH | 16 ml |
| 30 DAYS | | 16 ml |
| 40 DAYS | | 18 ml |
| 50 DAYS | | 23 ml |
| 60 DAYS | | 23 ml |

It is to be understood that the above-described arrangements are simply illustrative of the invention. Other arrangements may be devised by those skilled in the art which will embody the principles of the invention and fall within the spirit and scope thereof.

We claim:

1. A communications cable, which comprises:
   a core having a longitudinal axis and comprising at least one communications medium;
   a jacket which comprises a plastic material and which encloses said core:

a waterblocking system which is disposed between said core and said jacket, said waterblocking system comprising at least two concentric adjacent layers of waterblocking materials each being effective to inhibit the flow of water longitudinally along the cable; and a relatively supple yarn-like strength member system which is interposed between each two adjacent layers of said waterblocking system and which is in contact with at least one surface of each of the adjacent layers of the waterblocking system.

2. The cable of claim 1, wherein said relatively supple strength member system includes a fibrous material having a relatively high modulus.

3. The cable of claim 1, wherein each said waterblocking layer is a laminate comprising two longitudinally extending tapes with a superabsorbent powder disposed therebetween.

4. The cable of claim 1, wherein each said waterblocking layer comprises a substrate material which has been impregnated with a superabsorbent material.

5. The cable of claim 4, wherein said superabsorbent material is selected from the group consisting of (1) polyacrylic acid; (2) polyacrylamide; (3) blends of (1) and 2); (4) salts of (1) and (2); and (5) copolymers of (1) and (2).

6. The cable of claim 1, wherein at least one of said layers of said waterblocking system includes an outer layer of a superabsorbent material and a layer of acrylic fiber.

7. The cable of claim 1, wherein said core includes a centrally disposed, longitudinally extending waterblocking member.

8. The cable of claim 7, wherein said core comprises a plurality of optical fiber units which are disposed between said centrally disposed waterblocking member and an innermost one of said layers of said waterblocking system.

9. The cable of claim 8, which also includes a plurality of longitudinally extending members each made of a fibrous material and disposed between two adjacent optical fiber units and an innermost one of said layers of said waterblocking system.

10. The cable of claim 9, wherein each of said optical fiber units is stranded with a unidirectional lay about said centrally disposed waterblocking member.

11. The cable of claim 9, wherein each of said optical fiber units is stranded with a reverse oscillated lay about said centrally disposed waterblocking member.

12. The cable of claim 1, wherein said strength member system comprises yarn-like material which has been stranded with a unidirectional lay about an innermost one of said layers of waterblocking materials.

13. The cable of claim 1, wherein said strength member system comprises a yarn-like material which has been stranded with a reverse oscillated lay about one of said layers of waterblocking materials.

* * * * *